Nov. 7, 1967 C. PURDUM ET AL 3,351,692
METHOD OF FORMING AN IMAGE IN A PLASTIC SURFACE
Filed March 8, 1966 2 Sheets-Sheet 1

INVENTORS
Gary Purdum
Howard W. Gibney
Wood, Herron and Evans
ATTORNEYS

INVENTORS
Cary Purdum
Howard W. Gibney
Wood, Herron and Evans
ATTORNEYS

United States Patent Office 3,351,692
Patented Nov. 7, 1967

3,351,692
METHOD OF FORMING AN IMAGE IN A PLASTIC SURFACE
Cary Purdum and Howard W. Gibney, Middletown, Ohio, assignors to Aeronca, Inc., a corporation of Ohio
Filed Mar. 8, 1966, Ser. No. 532,711
17 Claims. (Cl. 264—132)

ABSTRACT OF THE DISCLOSURE

A method of impregnating and immobilizing a dye or pigment image in a plastic surface by forming the dye image on a carrier sheet, contacting the image-side of the carrier sheet with a self-polymerizable intermixture of a thermosetting resin and a curing agent, curing the intermixture at room temperature to form the plastic surface while at least a portion of the dye from the image on the carrier sheet impregnates the intermixture and becomes immobilized in the formed plastic surface and separating the carrier sheet from the formed plastic surface leaving the dye image impregnated and immobilized in the surface, protected against abrasion, heat and solvent action.

---

This application is a continuation in part application of our application Ser. No. 285,345, filed June 4, 1963, entitled, "Image Transfer Method."

This invention relates to a novel method of transferring an image and is particularly directed to a method for transferring an image onto a plastic surface so that the image is transferred with great accuracy and permanency.

At the present time, it is conventional in connection with various manufacturing operations, such as the fabrication of aircraft and missile components, to provide full-scale plastic tools or fixtures. These tools are frequently formed of a dimensionally stable epoxy resin. The working surface of the plastic tool may be relatively large, e.g. 50–100 sq. ft. This surface is frequently marked with a series of drawings, dimension lines, and the like, used for example to check details, to align parts during a lay-up operation, and to check a finished assembly. In the past, these drawings have been made by hand, or by securing an adhesive-backed polyethylene terephthalate sheet over a master pattern, or by complex photographic methods. Each of these prior art approaches to the problem of transferring control information onto a plastic sheet has inherent disadvantages.

Specifically, the manual transfer of any sizable quantity of information is laborious and time consuming. For example, to place the requisite information on one typical tool required the services of two skilled men for five days. This method has the additional, very serious drawback that the necessary accuracy is difficult to obtain and the work must be carefully checked to catch any human errors.

The method involving the physical adhesion of a polyester sheet, such as polyethylene terephthalate, to a surface is of limited application since it can be used only on tools of small size, i.e. less than a square foot. Also, in this method the information does not become a permanent part of the tool fixture. Rather, after a period of use the sheet may tend to shift relative to the fixture and the control lines may become obliterated so that the sheet must be replaced.

The photographic method is disadvantageous because it is limited to flat surfaces and requires very expensive equipment. For example, a typical installation for transferring images photographically may cost well in excess of $150,000.

The present invention is directed to a novel method of transferring an image onto a plastic surface so that the image is transferred with extreme accuracy and becomes a permanent integral part of the plastic surface onto which it is transferred.

More particularly, the present invention is predicated upon the empirical discovery and determination that an image can be transferred to certain resins as an adjunct to the step of polymerizing, or curing, the resin. The transfer is effected without the use of any external heat or pressure. Essentially, the present process entails the steps of forming an image on a carrier sheet with a suitable dye, placing an uncured mixture of a resin and curing agent (from which the die or fixture is molded) in contact with the carrier sheet and maintaining the resin in contact with the sheet during the curing period. After the resin has cured, the carrier and plastic are separated. A duplicate of the image formed on the carrier sheet is left on the surface of the plastic material. This image is actually embedded in the surface of the plastic and is unaffected by solvents or normal abrasion.

In one preferred mode of carrying out the present method, the information to be transferred is originally formed as an image on an ammonia developed diazo sensitized polyethylene terephthalate film. This film is placed over a master model and is covered with an epoxy resin mixed with a polyamine type curing agent. As the epoxy is cured, the image is transferred from the polyester film to the epoxy surface.

While the exact mechanism of the present transfer is not fully understood, it is believed that the dye used in forming the image dissolves in the curing agent. For example, when as in the above example a polyamine is employed as a hardener (curing agent), the polyamine has active amine ($NH_2$) radicals. These amine radicals act as solvents for various dyes, including aniline dyes and the diazo dyes forming the image on the sheet described above. These dyes are thus transferred from the carrier sheet and carried into solution in the curing agent. However, the amines of the curing agent also are effective to cross link with, and hence polymerize, the epoxy resin so that the transferred image becomes immobilized in the epoxy and is protected from abrasion, solvents and the like.

Another theory of transfer is that the dye or pigment used in forming the image dissolves or diffuses into the thermosetting resin as an adjunct to curing the resin. For example, low molecular weight epoxy resins also have a solvating effect on a dye or pigment, such as the well-known diazo and aniline dyes, which form an image on a carrier sheet. Exemplary of such resins are sold under the trademarks "Epon 812" and "Epon 828" by Shell Chemical Company. "Epon 828" is an epoxy resin of epichlorohydrin and 2,2(4-4'-dihydroxydiphenyl)propane having an average molecular weight of approximately 380 and an epoxide equivalent of about 180–195; and "Epon 812" is a mixture of branched di- and tri-epoxides made by the condensation of epichlorohydrin and glycerin, having an average molecular weight of about 306 with an epoxide equivalent of about 140–160. Thus, the solvating capacity of the resin for the dyed-image or, stated inversely, the capacity of the dye to diffuse into the resin as an adjunct of the step of curing, could effect the transfer. Of course, it is within the purview of theory that both the thermosetting resin and the curing agent of the curable intermixture can operate either alone or by coaction to dissolve or permit diffusion of at least a portion of the dye forming an image on the carrier sheet into the formed plastic surface.

Certain diluents which are present in the intermixtures of thermosetting resins and curing agents also have the capacity to dissolve certain dyes or pigments forming an image on a carrier sheet. It has been observed that certain resin diluents which aid in the handling of resin compositions for molding purposes have a solvating effect on the dye or pigment of the image. For example, resin diluents including organic solvents, such as aromatic hydrocarbons; polar solvents, such as ketones and ethers; epoxide group containing compounds, such as the mono- and di-glycidyl ethers including butyl glycidyl ether and epichlorohydrin; and other like diluents can act as the solvating force to dissolve or diffuse the diazo or aniline type dyes from the carrier sheet. Of course, it is conceivable that transfer by diffusion can be effected by a combination of the dissolving or diffusing power or interaction of a thermosetting resin, a curing agent and a resin diluent.

Whatever the precise mechanism of transfer, the curing of a self-polyermizable intermixture of a thermosetting resin and a curing agent, with or without an added resin diluent, without external heat and pressure while in contact with a carrier sheet image containing a dye or pigment, transfers at least a portion of the dye from the carrier sheet as an adjunct to the step of curing or polymerizing the resin.

One of the principal advantages of the present method is that the image transferred into the plastic is identical with the image formed on the carrier sheet. That is, the image transferred is sharp and coincides dimensionally with the master image on the carrier sheet.

A still further advantage of the present method is that the image formed is extremely permanent. Even after a tool provided with an image by means of the present method has been used for an extended period of time, the image remains sharp and clear. The image is not affected by abrasion, solvents, heat or the like, to which a plastic tool is normally subjected.

Another extremely important advantage of the present invention is that the method of image transfer is simple, economical and requires practically no time additional to that involved in forming an unmarked plastic tool.

Still another advantage of a preferred form of the present method in which an image is formed on a polyethylene terephthalate sheet is that the sheet simultaneously performs several functions in addition to acting as an image carrier. In the first place, the polyester sheet serves as a parting agent between the molded plastic fixture and the master pattern. Additionally, the polyester sheet imparts a very smooth finish to the plastic fixture and completely eliminates the need to resurface the master pattern before the plastic tool is formed.

While the present invention is particularly advantageous in connection with the transfer of control information onto plastic tools and fixtures in which environment dimensional stability and sharpness are critical factors, it is to be understood that the present invention is of broader scope and that the instant transfer method also is useful in connection with the formation of decorative plastic articles, and the like, in which dimensional stability and image sharpness are not prime requisites.

To illustrate the instant transfer method in connection with the formation of decorative plastic articles, and the like, suitable organic and inorganic pigments can be painted or drawn on a surface to form a carrier sheet from which colored images can be reproduced in the plastic surface which is to be decorated. For example, a solution or dispersion of an organic compound or dye, such as p-dimethylaminoazobenzenecarboxylic acid (methyl red dye), p-dimethylaminoazobenzenesulphonic acid (methyl orange dye), methyl rosaniline chloride (methyl violet dye), and other azo and aniline dyes, may be dissolved in suitable solvents, such as water, alcohol and the like, and painted onto a surface of a carrier sheet, such as polyethylene terephthalate, polyvinyl acetate, nylon, metal, glass and the like. The self-polymerizable intermixtures of thermosetting resins and curing agents can then be coated on the surface of the carrier sheet. After the cure period for the curable intermixture, the carrier sheet may then be separated from the cured plastic surface leaving a permanent and accurate colored reproduction in the surface of the cured product. The sharpness of the colored images thus reproduced depends upon the ability of the dye to avoid lateral diffusion while pentrating into the body of the formed plastic surface. However, it has been determined that such color reproduction from carrier sheets into a plastic surface as an adjunct to the step of polymerization in the absence of external heat and pressure can be effected accurately and permanently.

In addition to images formed on a carrier sheet by organic dyes, as above mentioned, inorganic pigments, such as graphite, metallic oxides including titanium oxides, iron oxides, copper oxides and the like, can also form the image and be transferred with the same degree of permanency and the same degree of dimensional stability. The pigments may be applied directly to a carrier sheet, for example, by merely scribing with a graphite pencil on a carrier sheet, such as polyethylene terephthalate. Alternatively, the pigments may be applied in the form of a solution or dispersion with a suitable liquid by painting or brushing on a suitable carrier sheet. An example of the latter case is to apply a metal oxide, such as cuprous oxide, in the form of a dispersion with an alcohol solvent.

In some instances, it may be desirable to apply a parting agent to a colored carrier sheet to aid in its removal from the plastic surface which is to be decorated, after the plastic surface is cured. The parting agent can be a standard paste floor wax as employed in the hereinafter described process. Other parting agents which can be used include the silicone sprays; polytetrafluoroethylene-dichlorodifluoromethane spray; soaps and other hydrocarbon waxes and oils. The spray parting agent is preferred when transferring decorative images inasmuch as it eliminates rubbing the colored image which can cause its distortion.

These and other objects and advantages of the present invention will be more readily appreciated from the following detailed description of the drawings illustrating one product manufactured by the present invention and one preferred mode of carrying out the present method.

Figure 1:
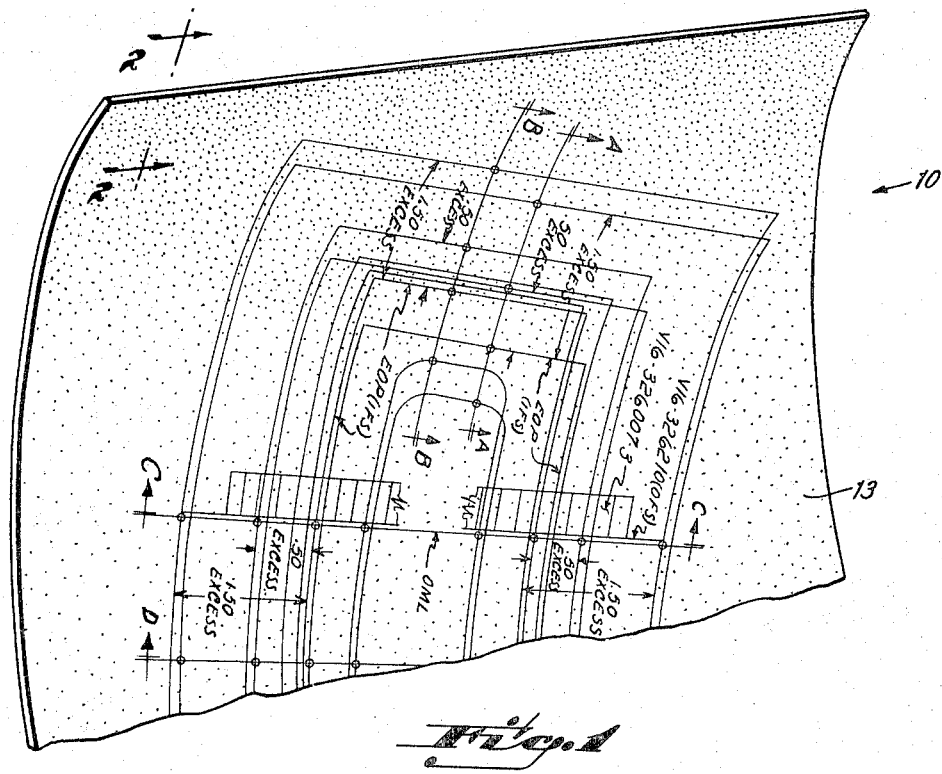
FIGURE 1 is a partial perspective view of a curved plastic fixture having tooling information placed on the surface thereof by means of the present invention.
Figure 2:
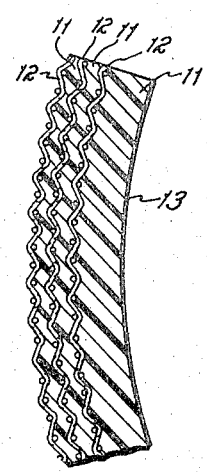
FIGURE 2 is a cross sectional view taken along line 2—2 of FIGURE 1.
Figure 3:
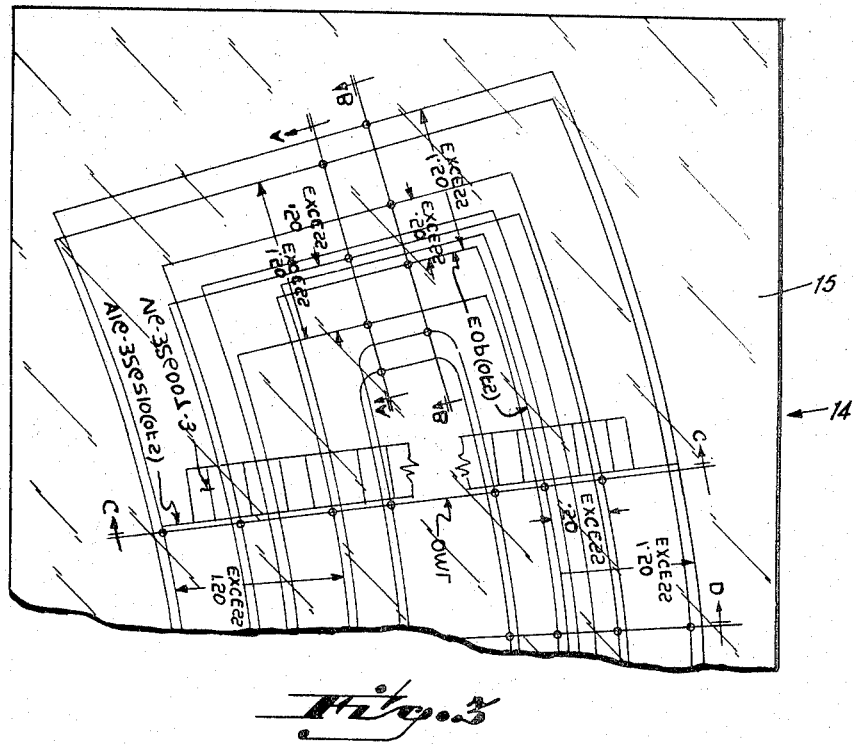
FIGURE 3 is a partial view of the sensitized surface of a polyester sheet carrying the information transferred to the fixture.
Figure 4:
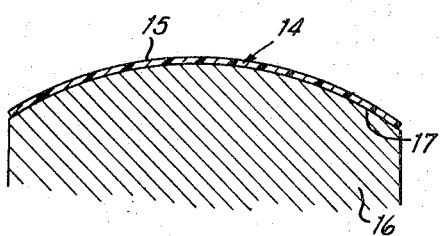
FIGURE 4 is a semi-diagrammatic cross sectional view showing the polyester sheet in place over a master pattern.

FIGURE 1 shows a typical plastic tool 10 fabricated in accordance with the principles of the present invention. More particularly, tool 10 is formed from laminated layers of an epoxy resin 11 and glass cloth 12. The tool has a smooth working surface 13. The surface of the particular embodiment shown is a simple curve of precise contour. It is to be understood that the present method can also be utilized to transfer images onto plane surfaces and surfaces having a mild compound curvature. The working surface 13 of tool 10 is provided with a plurality of lines, dimensions and other control information for the fabrication of a brazed metal assembly. It is to be understood, however, that the present invention is not limited to the transfer of such control information, but can also be used for the transfer of other images, such as decorative patterns.

In the tool 10 of FIGURE 1, the lines are sharp black lines on a white background and are positioned to a high degree of accuracy, for example, plus or minus five thousandths of an inch on a ten inch grid with no cumulative error. Moreover, a plurality of tools can be made identical with tool 10 and each will be within the same range of accuracy.

A preferred method of fabricating a tool, such as tool 10, is best shown in FIGURES 3–6. In accordance with this method, a full-scale tooling master layout (not shown) is exposed to a diazo sensitized polyethylene terephthalate (polyester) sheet 14, or the like, on a vacuum light table. One suitable form of diazo sensitized polyethylene terephthalate sheet is produced by Keuffel & Esser and is identified as "K & E Stabilene Sheet #45–1505" (formerly #465D). One surface 15 of this sheet is coated with a dry diazo polyester film coating composed of diazo sensitizers and couplers in a polymeric matrix of the cellulose acetate-butyrate type. The diazo sensitized surface 15 of this sheet is dry developed by a direct contact ammonia process. The image formed on this sheet is an exact mirror image of the original layout and is also an exact mirror image of the layout to be placed on working surface 13 of tool 10.

In the next step, polyester carrier sheet 14 is placed over a master model 16. This master model 16 may be formed of plaster, or the like, and includes an accurately contoured surface 17 which corresponds exactly to the desired contour of working surface 13 of the plastic tool 10. The sheet 14 is accurately positioned relative to the master model by suitable datum and control lines forming part of the image on the sheet corresponding datum and control lines placed upon the master pattern. Before the polyester sheet is placed over the master pattern, the master pattern is coated with a suitable material, such as petroleum jelly, for adhesively holding the sheet in position. Then the sheet is placed over the master pattern with the sensitized surface 15 exposed and the datum and control lines on sheet 14 and surface 17 exactly superimposed. The sheet is rolled outwardly from the center of the sheet to remove entrapped air and surplus petroleum jelly. With the polyester sheet so positioned, the flat pattern layout is configured in the true shape and development of the assemblies to be produced utilizing tool 10.

Figure 5:
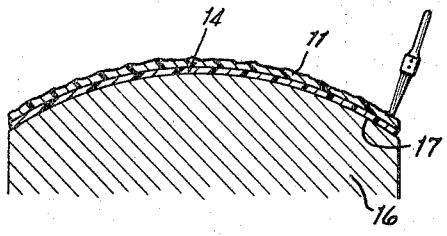
FIGURE 5 is a semi-diagrammatic cross sectional view showing a layer of resin being placed over the polyester sheet.
Figure 6:
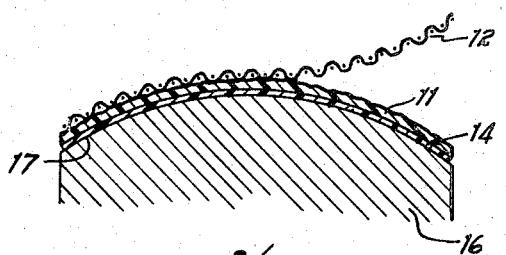
FIGURE 6 is a semi-diagrammatic cross sectional view similar to FIGURE 4 showing the step of placing a glass cloth over the resin layer.

In the next step of the process a parting agent is applied to the exposed surface 15 of the polyester sheet. One suitable form of parting agent is standard paste floor wax. Thereafter, as is shown in FIGURE 5, a mixture of epoxy resin and curing agent are applied over the sheet. One suitable form of epoxy is produced by Ren Plastic Company under the trademark "RP1710." "RP1710" resin contains about 70% of a mixture of epoxy resin, essentially, a digylcidyl ether of the 2,2(4,4'-dihydroxydiphenyl)propane with an epoxide equivalent range of 182–220, with butyl glycidyl ether plus 30% fillers and pigments. This resin is mixed in a stoichiometric ratio of five parts resin with one part "RP1710" hardener. (The exact amounts of hardener may vary from 10% less than the above ratio to 25% more than the ratio.) "RP1710" hardener contains about 85% of a modified aliphatic polyamine of the type of N-hydroxylpropyl triethylenetriamine plus 15% of a mixture of diphenols of the type of 2,2(4,4'-dihydroxydiphenyl)propane and less than .1% of an odor counteractant.

This epoxy resin and hardener mixture is coated over the polyethylene terephthalate sheet at room temperature. Next, a layer of 12 ounce glass fabric is placed over the epoxy resin. Subsequently, another layer of epoxy resin is coated over the fiber and another sheet of glass fiber is placed on top of the second epoxy layer. Finally, a third epoxy layer is placed over the second glass fabric and the third layer of glass fabric is placed over this epoxy layer. Thus, an epoxy resin-glass fabric laminate is built up to the order of approximately three-eighths to one-half inch. The thickness of this laminate is not critical and can be varied in accordance with the desired strength of the finished plastic tool. It is to be noted that the only force holding the epoxy resin and polyester sheet in contact is the weight of the epoxy resin and glass fiber which is of the order of only one-fourth of a pound per square foot. The present method of transfer depends only upon contact and does not require any appreciable pressure between the resin and polyethylene terephthalate sheet.

The resin is now cured at room temperature for a period of approximately twelve to eighteen hours. During this time at least a small portion of the diazo dye forming the lines of the image on polyethylene terephthalate sheet 14 is transferred into the self-polymerizable intermixture and at the same time the amines cross link with the epoxy resin to polymerize that resin and immobilize the dye.

After the curing cycle, the tool 10 is removed from the master pattern 16 and the polyester transfer sheet is stripped from the working surface 13 of the tool. The surface 13 now contains a complete mirror image of the information contained on the transfer sheet. The working surface 13 of the tool is exceedingly smooth since this surface has in effect been cast against the smooth transfer surface. The sheet 14 is removed intact and can be used in a similar way to again transfer the image formed on surface 15 to another plastic tool; or alternatively the sheet can be used for other control purposes. It has been empirically determined that the image from one polyethylene terephthalate sheet of the type disclosed can be transferred by the present process several times. However, the image becomes progressively less distinct so that as a practical matter it is usually preferable to make a carrier sheet for each tool 10 to be produced.

Microscopic examinations of edge cross-sections taken through the image impregnated epoxy tool surface formed in the above described embodiment have shown that the dye diffuses into the formed epoxy surface. The diffused dye can penetrate to a depth of several mils in the cured resin as streamers extending from the surface of the epoxy resin into the body. No definite boundary at the end of the streamers is detectable.

The completed tool 10 can be used to check individual components by placing the components over the tool. The tool can also be utilized in laying up components prior to a brazing operation. Finally, after the assembly has been brazed, the tool 10 can be utilized to check the final assembly. Since the image is impregnated in, or lies under the surface of the tool, the image remains completely legible even after protracted periods of use and is not adversely affected by normal abrasion, or by heat (for example, some parts are brought into contact with a tool at 180° F.) by solvents used to clean the tool or by oils and solvents inadvertently dropped onto the tool. The above described embodiment is particularly advantageous because the image obtained is an exceedingly sharp black image on an off-white surface. Very high dimensional accuracy is achieved.

In forming a plastic surface of predetermined configuration by the above detailed description, the carrier sheet with the image-side exposed is placed over the master pattern having the desired contour. The curable intermixture of resin and hardener is coated thereon and then allowed to cure. Alternatively, the master pattern having the desired contour of the plastic surface can be coated with the layer of curable resin, the image-side of the carrier sheet can be placed against the coated master pattern and the resin allowed to cure. In this alternative, numerous surfaces of different types and dimensions, such as wood, metal and the like, may be provided with a bonded plastic surface having controlled information impregnated therein. Further, the master pattern may be first coated with a release agent, then coated with the curable intermixture of resin, and then covered with the imaged carrier sheet. The resultant product is a contoured plastic replica of the pattern with the informaton impregnated in the surface opposite that of the mold contacting surface.

Other thermosetting resin materials can be employed satisfactorily in the present process from the class of polyester and epoxy resins. The epoxy resins are preferred and are generally of the type formed by the condensation of a polyol, such as glycerin, and an epoxide containing compound, such as epichlorohydrin. The methods of producing these compounds are well known in the field of polymer chemistry. Specific examples of epoxy resins include the resins produced by Shell Chemical Company under the trademarks "Epon 812," "Epon 815" and "Epon 828." "Epon 828" is an epoxy resin of epichlorohydrin and 2,2(4-4'-dihydroxydiphenyl)propane having an average molecular weight of about 380 and an epoxide equivalent of about 180–195. "Epon 812" is a mixture of branched di- and tri-epoxides made by the condensation of epichlorohydrin and glycerin, having an average molecular weight of about 306, containing about 10% by weight of tightly bound chlorine and having an epoxide aquivalent of about 140–160. "Epon 815" is an epoxy resin of epichlorohydrin and 2,2(4-4'-dihydroxydiphenyl) propane having an average molecular weight of about 330, an epoxide equivalent of about 175–195 and containing about 10–12% of butyl glycidyl ether. Other suitable resins of the types mentioned or their equivalents are, of course, within the purview of this invention.

Other curing agents which can be employed to form the polymerizable thermosetting resin intermixtures of this invention include amine type curing agents, such as polyalkyleneamines, polyamides, hydroxyalkylene amines and the like. Examples of suitable amines include diethylene triamine, N-hydroxylpropyl triethylenediamine and other hydroxyalkylene polyamines of the type disclosed in United States Patent No. 2,901,461 issued Aug. 25, 1959. Suitable polyamides include polyamide resins manufactured by General Mills, Inc., under the trademarks "Versamid 125a nd 115." These polyamides are the reaction products of dibasic vegetable oil acids and polyalkylene polyamines. "Versamid 115" has an amine value of about 210–230 and a viscosity, in poises at 40° C., of about 500–750. "Versamid 125" has an amine value of about 290–320 with a viscosity, in poises at 40° C., of from 80–120.

The exact amounts of resin to hardeners in the curable intermixtures are not critical and generally involve mixing in stoichiometric ratios. The cure periods for the curable intermixtures depend, of course, on the components used and in general can range from about less than one hour to about 24 hours.

As mentioned, other carrier or transfer sheets on which the image is formed can be employed. The present invention is not limited to the transfer of images from polyethylene terephthalate film. For example, images can be transferred from paper, such as tracing paper and kraft paper, and other sheets including polyvinyl acetate, nylon, metal and the like.

The images can be formed on the transfer sheet by pen, brush, dry ammonia development of diazo and aniline sensitized layers and the like. The images contain a suitable dye or pigment, such as the organic diazo and aniline dyes or the inorganic pigments of the type mentioned. The dyes or pigments can be applied directly in solid form or in liquid admixture to the carrier sheet to form the image. The use of such dyes enables colored images, such as decorative patterns, to be transferred as well as the black and white images referred to above. However, the transferred images using some of these dyes may tend to blur slightly in certain plastic surfaces in comparison to the exceedingly sharp images produced using the materials of the first example described above. Therefore, when control data is to be transferred, the image is preferably formed on the carrier sheet by dry ammonia development of a sensitized diazo or aniline dye fixed in an emulsion polymer matrix, such as callulosic derivatives of the cellulose-acetate butyrate type.

Other examples illustrating the practice of this invention follow, but it is to be understood that they are not to be regarded as limitations thereof.

*Example I*

A striped, colored image was produced on a polyethylene terephthalate carrier sheet by brushing on a solution of 0.2 gram of the sodium salt of p-dimethylaminoazobenzenecarboxylic acid (methyl red dye) in a 60% solution of ethanol in water. The solution dried as a red colored stripe on the surface of the film.

The imaged surface of the carrier sheet was then coated with a curable resin mixture of 11 parts by weight of epoxy resin and 2 parts by weight of hardener. The epoxy resin was essentially a mixture of about 70% by weight of a diglycidyl ether of 2,2(4,4'-dihydroxydiphenyl)propane having an epoxy equivalent range of 182–220, with butyl glycidyl ether diluent plus 30% by weight of fillers and pigments (RP–1710 epoxy resin by Ren Plastics Company). The hardener was essentially about 85% by weight of N-hydroxylpropyl triethyleneamine and 15% by weight of 2,2(4,4'-dihydroxydiphenyl) propane (RP–1710 hardener by Ren Plastics Company). The curable resin mixture was then covered with a layer of glass cloth and the cloth was worked into the resin coating. A second coating of the curable resin mixture was applied to the first glass and resin layup. A sheet of aluminum was drawn across the resin-cloth layup to eliminate voids and to remove the excess curable resin mixture.

The formed layup was allowed to cure at room temperature to form a solid resinous-glass cloth. The carrier sheet was then separated from the cured product and the stripe of methyl red dye was found to have penetrated as a yellow colored image into the smooth surface of the cured resin product. The color change from red to yellow was apparently caused by the basicity of the curable resin components. The end portions of the colored stripe in the cured surface were precise and no ragged lateral diffusion was observed. The penetrated image in the cured resin surface was also unaffected by rubbing and could only be removed by gouging the resin surface with a knife thereby destroying the smooth resin surface itself.

*Example II*

The procedures of Example I were repeated, except in this instance the colored image was formed on polyethylene terephthalate carrier sheet by dotting a solution of 0.2 gram of the sodium salt of p-dimethylaminoazobenzenesulfonic acid (methyl orange dye) in 100 ml. of water. The solution dried as an orange colored image on the surface of the film.

Upon removal of the film from the cured resin layup, the orange dye was found to have penetrated into the surface of the cured resin product in precise detail corresponding to the dotted areas originally on the carrier sheet. The parmanency of the image in the cured resin surface was of the same character as described for the imaged product of Example I.

*Example III*

The procedures of Example I were repeated, except in this instance the colored image was formed on the polyethylene terephthalate carrier sheet by striping on a solution of 0.2 gram methyl rosaniline chloride (methyl violet dye) in 100 ml. of water. The image dried violet on the surface on the film.

Upon removal of the film from the cured resin layup, the violet dye was found to have penetrated in the same accurate and permanent fashion as described in the preceding examples.

Example IV

The procedures of Example I were repeated, except in this instance two types of images were formed on separate portions of the polyethylene terephthalate carrier sheet. One colored image was formed by striping on a fine dispersion of 5 grams cuprous oxide in 50 ml. of ethanol. Another image was formed on a separate portion of the film by writing upon the film with a graphite pencil. The cuprous oxide image dried to form a soft red powder. The transfer film was difficult to mark with the graphite pencil owing to its smooth slippery surface.

Upon removal of the carrier sheet from the cured resin layup, both the cuprous oxide and graphite images were found to have penetrated in the same accurate and permanent fashion as described in the above examples. The graphite pencil image in the surface of the cured resin was distinct against the relatively white background formed by fillers and pigments of the cured resin.

Example V

The procedures of Example I were repeated, except in this instance the imaged surface of the carrier sheet was first spray coated with a release agent of polytetrafluoroethylene solids in dichlorodifluoromethane. The resulting surface was then coated with a curable resin mixture of (a) 100 parts by weight of an epoxy resin formed by condensing epichlorohydrin and 2,2(4,4'-dihydroxydiphenyl)propane having an epoxide equivalent of about 180–195 and an average molecular weight of about 380 ("Epon 828" by Shell Chemical Co.), and (b) about 9 parts by weight of diethylenetriamine. Upon removal of the transfer film, it was found that the color transferred into the surface of the cured resin product and this transferred image had the same general characteristics of preciseness and permanency as that of Example I.

Example VI

Two colored images were produced on separate protions of a polyethylene terephthalate carrier sheet. The first image was formed by brushing a solution of 0.2 gram of the sodium salt of p-dimethylaminoazobenzenesulfonic acid in 100 ml. of water. This solution dried as an orange colored image on the surface of the film. A second portion of the transfer film was imaged by brushing on a dispersion of 5 grams cuprous oxide in 50 ml. of ethanol.

The image surface of the carrier sheet was first spray coated with release agent of polytetrafluoroethylene solids in dichlorodifluoromethane. After drying, the imaged surface was then coated with a curable resin mixture of (a) 100 parts by weight of an epoxy resin mixture of di- and tri-expoxides made by the condensation of epichlorohydrin and glycerin, having an epoxide equivalent of about 140–160, an average molecular weight of about 360, and containing about 10% by weight of tightly bound chlorine ("Epon 812" by Shell Chemical Co.), and (b) about 9 parts by weight of diethylenetriamine. The curable resin mixture was then covered with a layer of glass cloth and the cloth was worked into the resin coating. A second coating of the curable resin mixture was applied to the resin and glass layup. A sheet of aluminum was then drawn across the resin-cloth layup to eliminate voids and to remove excess curable resin mixture.

The formed layup was then allowed to cure at room temperature to form a solid resinous-glass cloth product. After the carrier sheet was separated from the cured product, both the dyed image and the red cuprous oxide image were found to have penetrated into the smooth surface of the cured resin product.

The transferred images in the surface of the cured product possessed the same general characteristics as described for the products in the above examples.

From the above disclosure of the general principles of the present invention and the above description of several modes of practicing the invention, those skilled in the art will readily comprehend various modifications to which the invention is susceptible. Accordingly, we desire to be limited only by the scope of the following claims.

We claim:
1. A method of forming an epoxy tool having a working face of predetermined configuration which comprises:
    forming an image containing a dye selected from the group consisting of azo and aniline dyes on a carrier sheet,
    placing said carrier sheet with the image-side exposed over a master pattern having the desired contour of the plastic surface,
    coating the image-side of the carrier sheet with a self-polymerizable intermixture of an epoxy resin and an amine curing agent selected from the group consisting of polyamines and polyamides,
    curing said intermixture at room temperature to form the epoxy tool whereby at least a portion of the dye from the carrier sheet transfers into the formed epoxy surface, and
    separating the carrier sheet from the formed plastic surface leaving the image on the surface of the epoxy tool having the working face of predetermined configuration.

2. A method as defined in claim 1 wherein the intermixture also contains an epoxy resin diluent.

3. A method as defined in claim 1 wherein the image is formed by dry ammonia development on a diazo sensitized polyethylene terephthalate carrier sheet.

4. A method of forming an image in a plastic surface which comprises:
    forming an image consisting essentially of a dye on a carrier sheet,
    contacting the image-side of the carrier sheet with a self-polymerizable intermixture of a thermosetting resin and a curing agent,
    curing said intermixture at room temperature without any appreciable external pressure applied between the resin and the sheet to form the plastic surface while at least a portion of dye from the image on the carrier sheet impregnates said intermixture and and becomes immobilized in the formed plastic surface, and
    separating the carrier sheet from the formed plastic surface leaving the dye image impregnated and immobilized in the plastic surface in clear and legible form whereby the dye image is protected in the plastic surface against abrasion, heat and solvent action.

5. A method as defined in claim 4 wherein the intermixture also contains a resin diluent.

6. A method as defined in claim 4 wherein the thermosetting resin is an epoxy resin.

7. A method as defined in claim 4 wherein the thermosetting resin is an epoxy resin and the curing agent is an amine.

8. A method as defined in claim 7 wherein the amine curing agent is selected from the group consisting of polyamides and polyamines.

9. A method as defined in claim 4 wherein the intermixture also contains an epoxy resin diluent and the thermosetting is an epoxy resin.

10. A method as defined in claim 4 wherein the dye is selected from the group consisting of azo and aniline dyes, and the intermixture is an epoxy thermosetting resin and an amine curing agent.

11. A method as defined in claim 10 wherein the intermixture also contains an epoxy resin diluent.

12. A method as defined in claim 5 wherein the epoxy resin diluent is an epoxide group containing compound.

13. A method of forming an image in a plastic surface having a predetermined configuration which comprises;

forming an image consisting essentially of a dye on a carrier sheet, forming a cover on the surface of a master pattern having the desired contour of the plastic surface, said cover being formed by the carrier sheet and a layer of a self-polymerizable intermixture of a thermosetting resin and a curing agent, said layer being in contact with the image-side of the carrier sheet, curing said intermixture at room temperature without any appreciable external pressure applied between the resin and the sheet to form the plastic surface while at least a portion of said dye from the image on the carrier sheet impregnates said intermixture and becomes immobilized in the formed plastic surface, and separating the carrier sheet from the formed plastic surface leaving the dye image impregnated and immobilized in the plastic surface in clear and legible form whereby the dye image is protected in the plastic surface against abrasion, heat and solvent action.

14. A method as defined in claim 13 wherein the curable intermixture also contains a resin diluent.

15. A method as defined in claim 13 wherein the thermosetting resin is an epoxy resin and the curing agent is an amine.

16. A method as defined in claim 13 wherein the thermosetting resin is an epoxy resin, the curing agent is an amine and the intermixture also contains an epoxy resin diluent.

17. A method of forming an image in an epoxy surface which comprises:

forming an image containing a dye selected from the group consisting of azo and aniline dyes on a carrier sheet, contacting the image-side of the carrier sheet with a self-polymerizable intermixture of an epoxy resin and an amine curing agent selected from the group consisting of polyamines and polyamides, curing said intermixture at room temperature to form the epoxy surface whereby at least a portion of dye from the image on the carrier sheet transfers into the formed epoxy surface, and separating the carrier sheet from the formed epoxy surface leaving the image immobilized and impregnated in the formed surface in clear and legible form whereby the dye image is protected in the formed surface against abrasion, heat and solvent action.

References Cited

UNITED STATES PATENTS 2,962,764   12/1960   Trojanowski   264—316 X
2,856,635   10/1958   Gerson   264

ROBERT F. WHITE, *Primary Examiner.*

R. B. MOFFITT, R. KUCIA, *Assistant Examiners.*